United States Patent [19]

Baxter

[11] Patent Number: 5,497,606
[45] Date of Patent: Mar. 12, 1996

[54] MOWER WITH FORWARD MOUNTED EDGER

[76] Inventor: Robert H. Baxter, 1507 West Ct., Harrison, Ark. 72601

[21] Appl. No.: 316,567

[22] Filed: Sep. 30, 1994

[51] Int. Cl.[6] .......................... A01D 34/43; A01D 34/47; A01D 34/56; A01D 34/64
[52] U.S. Cl. .............. 56/16.9; 56/11.6; 56/13.7; 56/17.1; 56/256
[58] Field of Search .................................. 56/16.9, 17.5, 56/17.1, 13.7, 13.6, 11.6, 256; 172/15

[56] References Cited

U.S. PATENT DOCUMENTS

| | | | |
|---|---|---|---|
| 2,771,730 | 11/1956 | True . | |
| 3,319,406 | 5/1967 | Miles . | |
| 3,668,845 | 6/1972 | Parker | 56/11.6 |
| 3,693,334 | 9/1972 | Lowery | 56/16.9 |
| 3,698,165 | 10/1972 | Keesee | 56/11.4 |
| 3,710,563 | 1/1973 | Polette et al. | 56/16.9 |
| 3,782,085 | 1/1974 | Parker et al. | 56/11.6 |
| 3,803,818 | 4/1974 | Chaney | 56/16.9 X |
| 3,812,917 | 5/1974 | Strate | 172/15 |
| 3,871,160 | 3/1975 | Hooper | 56/16.9 |
| 3,969,877 | 7/1976 | Moss et al. | 56/256 |
| 4,453,372 | 6/1984 | Remer | 56/13.7 |
| 4,478,028 | 10/1984 | Dawson, Jr. | 56/16.9 |
| 4,551,967 | 11/1985 | Murcko | 56/13.7 |
| 4,965,990 | 10/1990 | Slawson et al. | 56/16.9 X |

Primary Examiner—Stephen J. Novosad
Attorney, Agent, or Firm—Head & Johnson; Robert R. Keegan

[57] ABSTRACT

There is disclosed an improved lawnmowing and edging apparatus wherein a generally conventional gasoline powered push mower or walk-behind mower is provided with an edger mounted on the front of the deck of the mower slightly outside of the track of one of the front wheels, the edger having a high speed rotating blade which lies in a vertical plane and which can be raised to an inoperative position or lowered to an operative position. The edger is provided with a very simple belt and pulley drive which causes the edger to be powered only in its lowered position and which derives its motive power from a power-take-off extending outward from the lawnmower engine substantially at right angles to the direction of travel of the mower. The power-take-off shaft is thereby substantially parallel to the shaft of the edger and a simple trouble free and safe power drive mechanism can be provided for the edger. The engine power-take-off preferably has a gear ratio to rotate at between ⅔ and ¼ of the speed of the main vertical mowing blade shaft so that a single belt drive may readily provide adequate speed increase for the effective operation of the edger; the speed of the power-take-off shaft also makes it suitable, with speed reduction, to provide a drive for the lawnmower wheels if desired. The edger is provided with pivotally yieldable blades to minimize damage upon striking of rocks or other objects; the blades may be either metal or plastic.

16 Claims, 6 Drawing Sheets

MOWER WITH FORWARD MOUNTED EDGER

SUMMARY OF THE INVENTION

The present invention relates to power lawnmowers, particularly or the push mower or walk-behind mower variety, which are provided with an edger mounted thereon suitable for edging along sidewalk or driveway borders of the lawn.

The most common method and apparatus for mowing and edging a lawn or other landscaped area involves use of a rotary blade power lawnmower for mowing the lawn grass and using a separate motorized hand-held edger for edging the grass along sidewalks, driveways and other borders of the lawn grass. There have been numerous previous proposals for apparatus that would combine the function of a lawnmower and an edger, but such apparatus has failed to find substantial acceptance because of the inadequacies and deficiencies resulting from techniques used to provide the disparate functions involved. Many of the previous combined edger and mower devices utilize the internal combustion engine for the lawnmower as the source of power for the edger, and this requires that some form of power-take-off be arranged to transfer power from the centrally located engine to the edger blade mounted peripherally on the mower.

Some engines provided by manufacturers for employment in lawnmowers have only the single vertical shaft intended to be directly connected to the rotating mower blade, in which case the power transfer mechanism for the edger must originate at the central vertical shaft, and the rotational axis of the power train must be changed from vertical to horizontal, while at the same time the power train must extend from the center of the mower housing to the periphery thereof. An example of such an arrangement is shown in U.S. Pat. No. 4,453,372 to Remer issued Jun. 12, 1984 (U.S. Cl. 56/13.7). Remer uses a friction wheel take-off from the main vertical mower shaft and a flexible cable drive to transfer power to a peripherally mounted edger wheel. U.S. Pat. No. 4,551,967 to Murcko issued Nov. 12, 1985 (U.S. Cl. 56/13.7) also has a power transfer originating at the central vertical main mower shaft. Murcko uses a complex belt drive with change of direction and change of pulley rotation axis for the power transfer mechanism. U.S. Pat. No. 3,803,818 to Chaney issued Apr. 16, 1974 (U.S. Cl. 56/11.6) similarly employs a complex belt drive extending from the central mower power shaft to the peripherally mounted edger. U.S. Pat. No. 3,782,085 to Parker et al. issued Jan. 1, 1974 (U.S. Cl. 56/11.6) shows a similar complex two-belt drive originating at the central mower vertical shaft and extending to an outrigger mounted rotatable cutter which may be employed with a vertical or a horizontal axis of rotation. U.S. Pat. No. 3,710,563 to Polette et al. issued Jan. 16, 1973 (U.S. Cl. 56/16.9) employs a power mechanism consisting of a single belt and pulley drive from the central vertical mower shaft in conjunction with a gear box for converting a rotation axis from vertical to horizontal.

U.S. Pat. No. 3,698,165 to Keesee issued Oct. 17, 1972 (U.S. Cl. 56/11.4) shows what appears to be a riding mower with a power-take-off shaft extending parallel to the mower direction of travel, and which is connected by belts and a transmission through multiple direction changes to power a side mounted edger blade. The same transmission is used to transmit power to the vehicle wheels through friction rollers.

U.S. Pat. No. 3,968,772 to Moss et al. issued Jul. 20, 1976 (U.S. Cl. 56/256) shows an edger attachment for a lawnmower particularly adapted to permit the blade to rotate in a horizontal plane as well as in a vertical plane, and which is connected to the mower engine by a drive train including a belt drive and a sprocket chain drive. U.S. Pat. No. 3,319,406 to Miles issued May 16, 1967 (U.S. Cl. 56-25.4) has an edger blade shaft powered from a wire brush wheel frictionally and intermittently contacting the main mower blade. U.S. Pat. No. 4,478,028 to Dawson, Jr. issued Oct. 23, 1984 (U.S. Cl. 56/16.9) shows an edger mechanism with a power train originating at a horizontal power-take-off shaft from the mower engine and including a first speed increasing sprocket chain drive and a second speed increasing belt drive to transmit power to the horizontally disposed edger shaft.

Numerous other attempts to provide a practical and reliable combination mower and edger have been made and are exemplified by the following patents: U.S. Pat. No. 2,771,730 to True issued Nov. 27, 1956 (U.S. Cl. 56-25.5); U.S. Pat. No. 3,668,845 to Parker issued Jun. 13, 1972 (U.S. Cl. 56/11.6); U.S. Pat. No. 3,710,563 to Polette et al. issued Jan. 16, 1973 (U.S. Cl. 56/16.9); U.S. Pat. No. 3,812,917 to Strate issued May 28, 1974 (U.S. Cl. 172/15).

The present invention which provides a side extending power-take-off operating at a speed slightly less than the main mower shaft together with a simple practical and reliable belt drive for coupling power to the edger shaft when in lowered operative position is not shown or suggested by any of the mower/edger patent disclosures.

The improved lawnmowing and edging apparatus according to the invention includes a generally conventional power push mower or power walk-behind mower provided with an edger mounted on the front of the deck of the mower, the edger having a high speed rotating blade with a horizontal axis of rotation which can be raised to an inoperative position or lowered to an operative position. The vertical plane of the rotating blades lies slightly outside of the track of one of the front wheels. A very simple and reliable belt and pulley drive is provided for high speed rotation of the edger and is preferably arranged so that power is provided to the edger only in its lowered position. The drive pulley for the edger is mounted on a horizontal power-take-off shaft extending outward from a lawnmower engine substantially at right angles to the mower direction of travel, and, accordingly, the power-take-off shaft is substantially parallel to the shaft of the edger. A toothed belt or a V-belt is connected between the drive pulley on the take-off shaft and a pulley on the shaft of the edger; preferably the drive pulley is of greater diameter than the driven pulley on the edger shaft causing the edger speed to be greater than the take-off shaft speed. Since the engine power-take-off speed is determined to be only slightly less than the main mower shaft speed, the edger can be driven by a single speed-increasing belt drive at a rotational speed approximately equal to or slightly greater than the rotational speed of the main mower vertical shaft, which speed provides effective and near ideal operation.

Certain embodiments of the mower will use a second pulley on the power-take-off shaft and a belt drive associated therewith to drive the lawnmower wheels. The lawnmower wheel drive preferably has a speed reduction provided by a belt drive with a smaller pulley on the power-take-off shaft and a larger pulley on the shaft for rotating the wheels, by small friction wheel engagement of the mower wheels.

The edger blade includes a mounting disc, preferably having three or more pivotally mounted metal or plastic blades whereby impacting blades will yield upon striking rocks or other objects to minimize damage.

In addition to providing the above features and advantages it is an object of the present invention to provide a combined lawnmowing and edging apparatus whereby the edging apparatus is powered from the same motor as the vertically disposed main shaft for the mower, and wherein the speed of the horizontally disposed power-take-off shaft is determined to be between slightly more than half and slightly less than one-quarter of the main vertical shaft speed, with the result that a simple and reliable speed increasing single belt drive may be provided for rotating the edger blade at optimum speed from the power-take-off shaft.

It is another object of the present invention to provide such a combined lawnmowing and edging apparatus wherein the power-take-off shaft used to power the edger blade is also used to drive two or more of the lawnmower wheels through a belt drive having its drive pulley also mounted on the take-off shaft.

Other objects and advantages of the present invention will be apparent from consideration of the following description in conjunction with the appended drawings described below.

DETAILED DESCRIPTION

Figure 1:
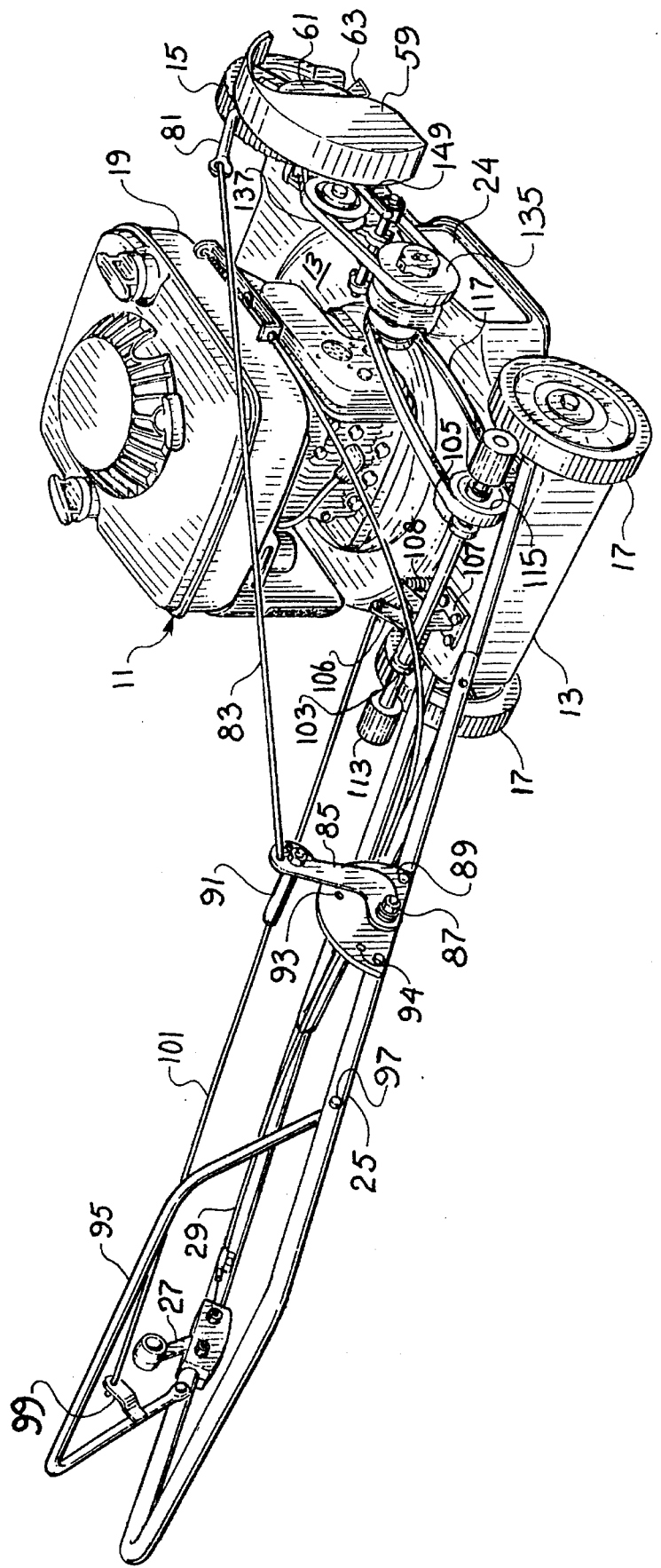
FIG. 1 is a perspective view of a combined lawnmowing and edging apparatus according to the invention.

Referring now to the drawings and particularly FIGS. 1–4 a walk-behind gasoline powered lawnmower 11 is shown having a generally conventional deck 13 on which are mounted a pair of front wheels 15 and a pair of rear wheels 17 in a generally conventional manner. An engine 19 is mounted centrally on the mower deck 13; gasoline engine 19 provides a motor for the lawnmower and has a shaft 21 extending vertically from the bottom or the engine 19 on which is mounted a mower blade 23, all of the foregoing being generally conventional in construction.

Deck 13 has an exhaust chute 24 for air and grass clippings expelled by the rapid rotation (typically 3600 RPM) of blade 23. It should be noted that the drawings generally do not show required safety features such as a chute extension for chute 24, guards for the various belts, pulleys and other moving parts, all of which would be provided in conventional fashion, but which have been omitted from the drawings for clarity in showing the working parts of the apparatus.

Lawnmower 11 is provided with a conventional operator's U-shaped handle 25 on which is mounted a throttle control lever 27 linked by sheathed cable 29 to the engine 19 providing control of the fuel supplied to the engine and engine speed, all in a conventional fashion.

Figure 2:
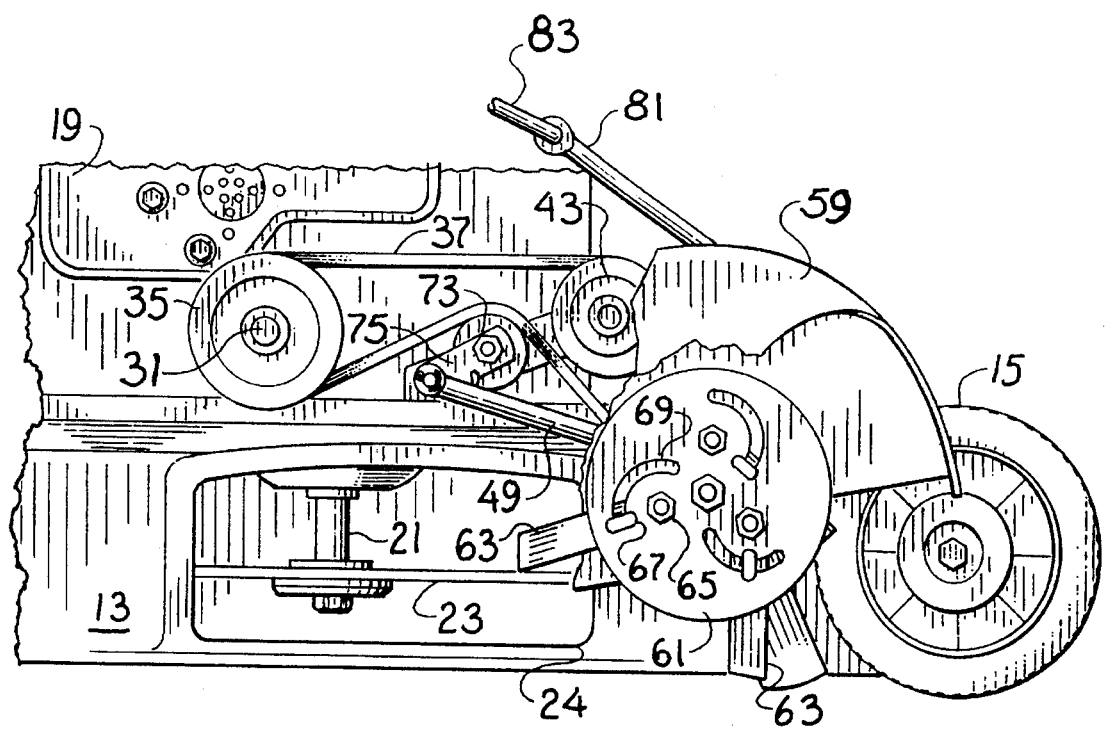
FIG. 2 is a fragmentary side elevational view, partially broken away to show the edger apparatus.
Figure 5:
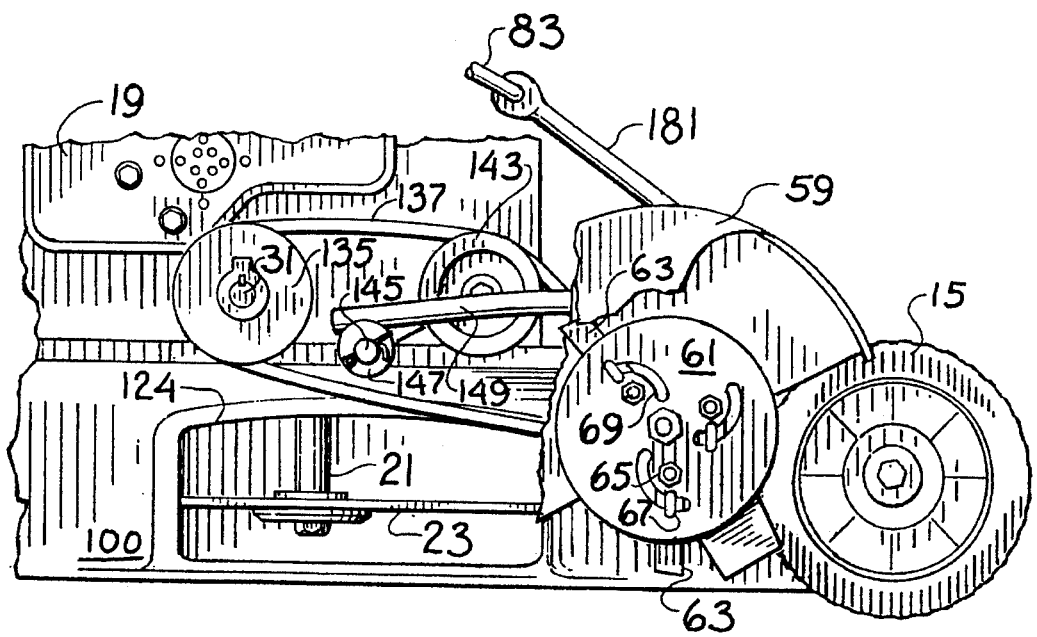
FIG. 5 is a fragmentary side elevational view of an alternative form of edger belt drive suitable for the apparatus of FIG. 1.
Figure 3:
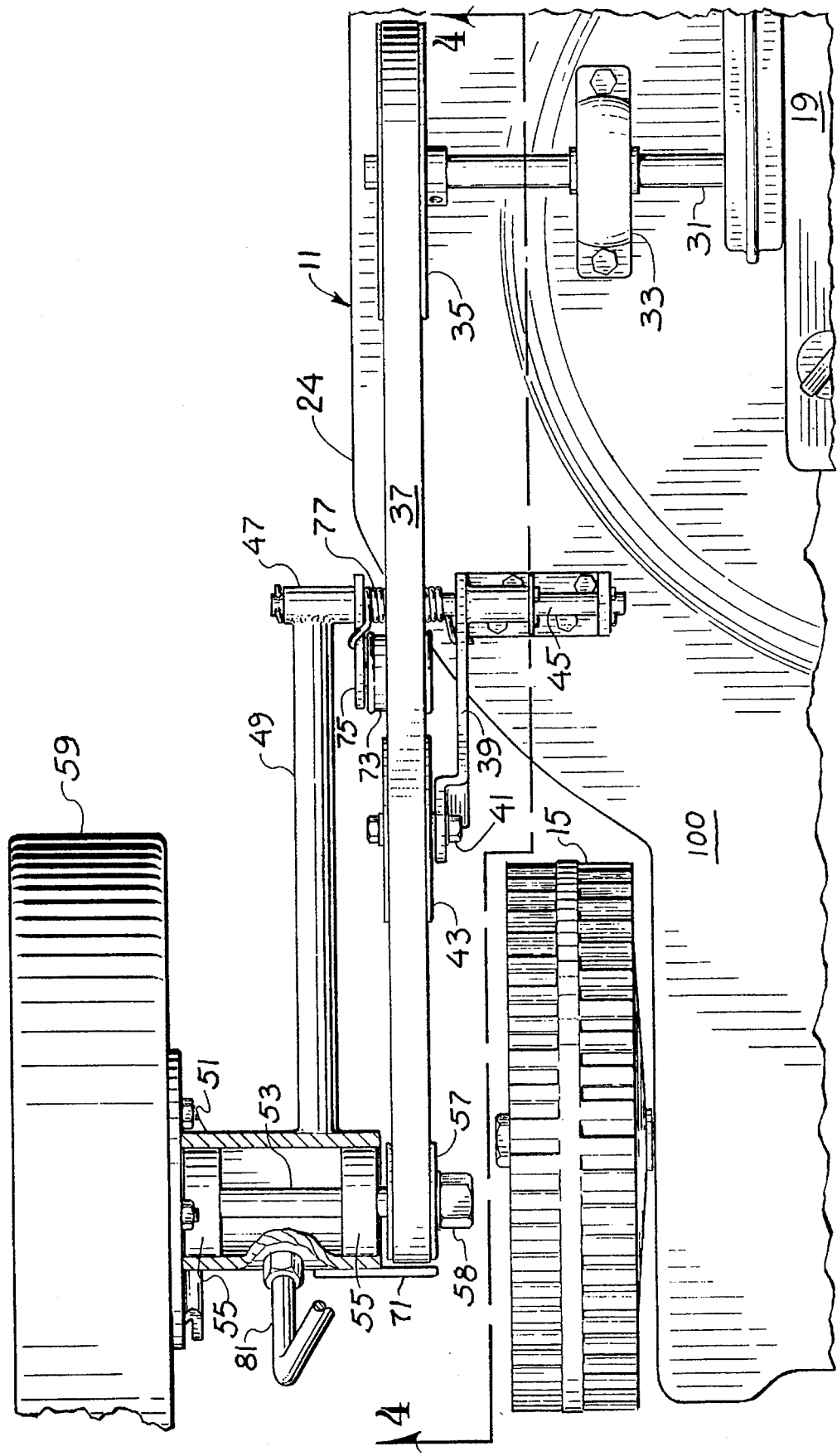
FIG. 3 is a fragmentary top plan view of the edger belt drive.
Figure 4:
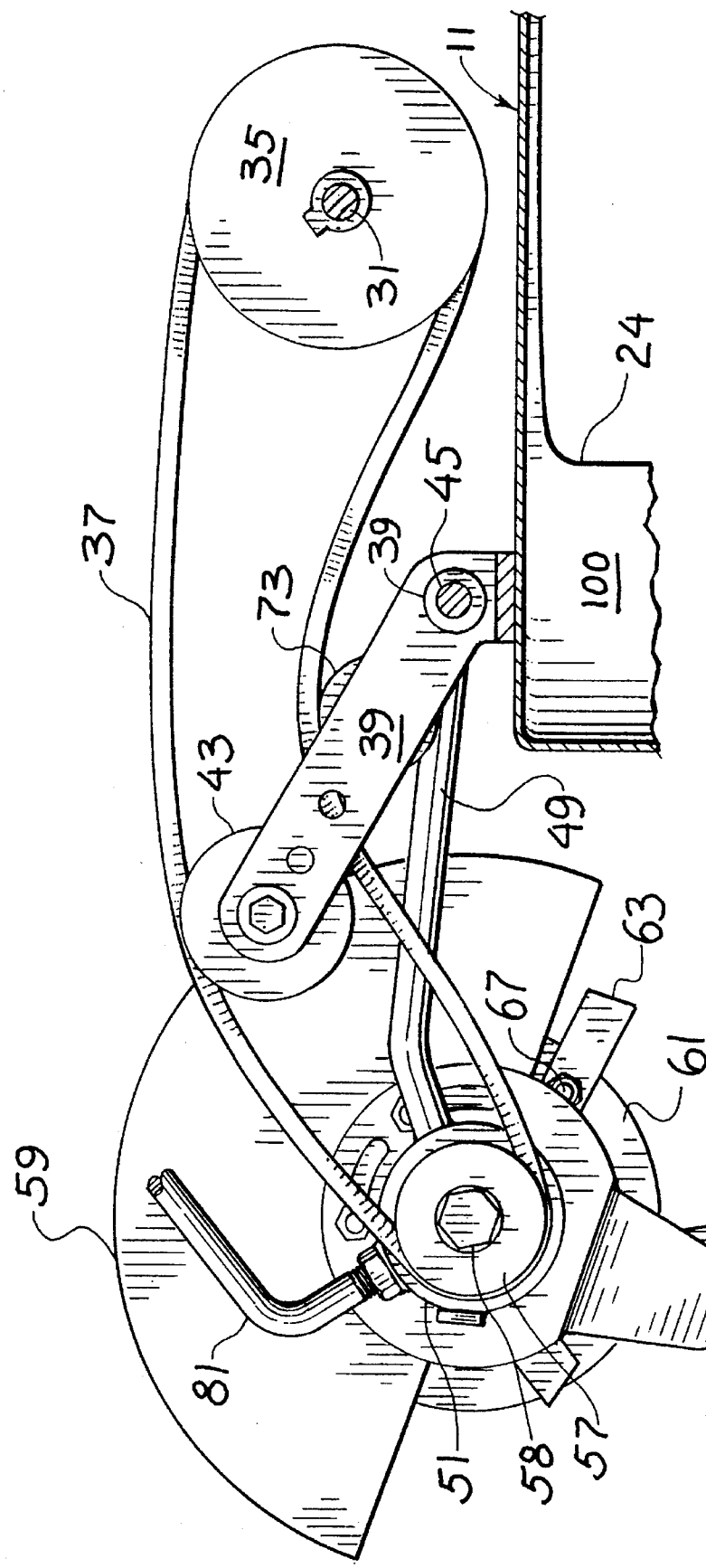
FIG. 4 is a fragmentary sectional view taken along the line 4—4 in FIG. 3.

Engine 19 is provided with a power-take-off shaft 31 extending horizontally from the right side of engine 19. Power-take-off shaft 31 has an axis of rotation which is generally at right angles to the direction of travel of lawnmower 11 and, thus, parallel to the axes of rotations of mower wheels 15 and 17. Shaft 31 rotation is counter-clockwise as seen in FIG. 2.

The speed of rotation of power-take-off shaft 31 is determined by internal gearing in the engine 19 in a conventional manner, and the ratio or the speed of rotation of power-take-off shaft 31 relative to the speed of rotation of main shaft 21 is very important in obtaining the advantage of certain features of the present invention. The speed of rotation of the power-take-off shaft is less than the speed of rotation of the main shaft 21 and lies between the ratios of 2:3 and 1:4. More specifically, the preferred speed ratio of power-take-off shaft to main output shaft is 1:3.75.

Figure 6:
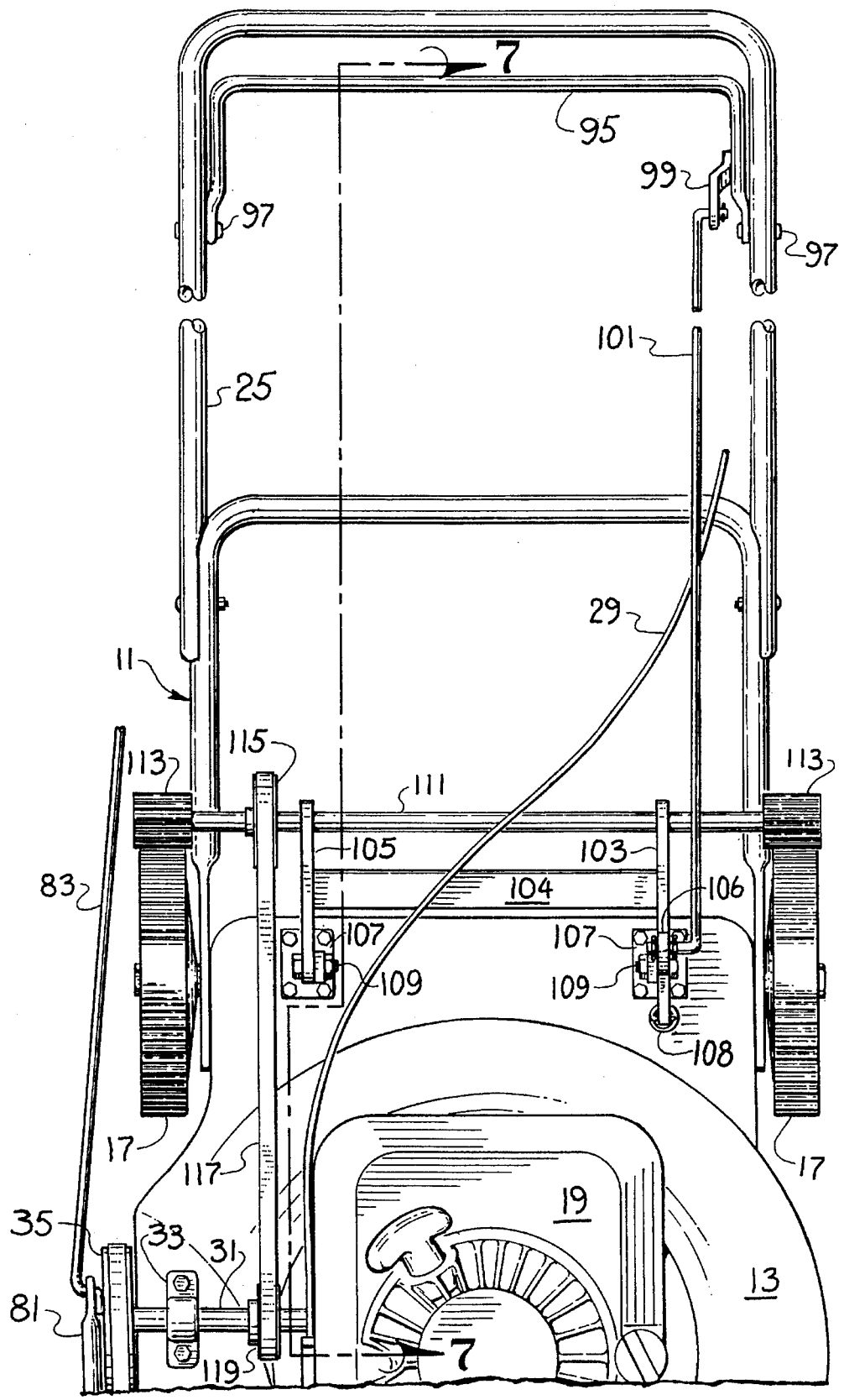
FIG. 6 is a fragmentary top plan view showing details of the optional belt drive for rear wheels from the common power-take-off shaft.
Figure 7:
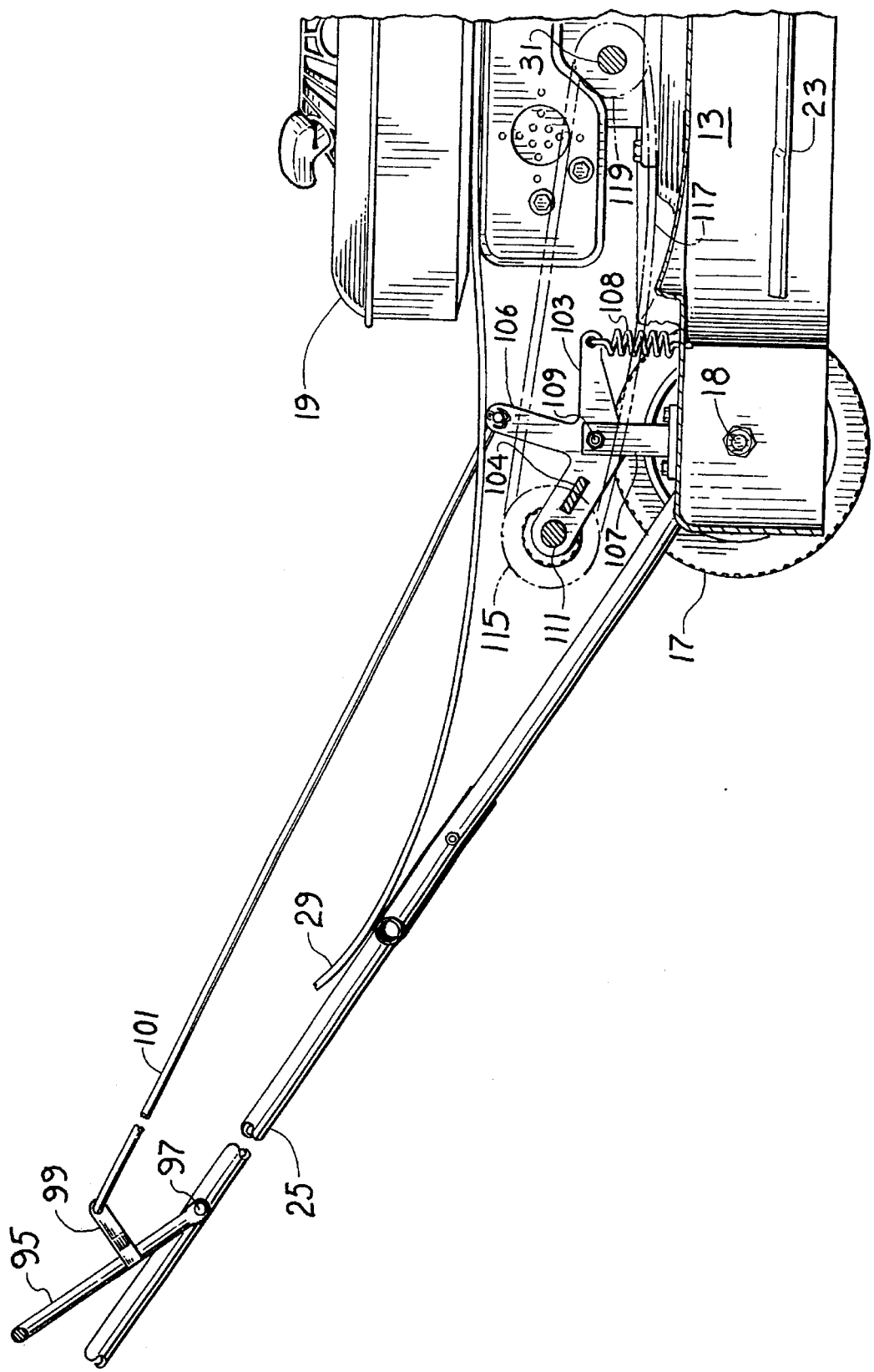
FIG. 7 is a fragmentary vertical sectional view taken along the line 7—7 in FIG. 6.

Power-take-off shaft 31 is supported by a bearing block 33 and has near its end a V-belt pulley 35 used as the drive pulley for the edger unit of the mower. It will be noted that FIGS. 1, 6, and 7 show an optional wheel drive unit for the mower 11, but the drive mechanism for the wheel drive unit is omitted in FIGS. 2, 3, 4, and 5 for simplicity in describing the edger unit and its drive mechanism. The wheel drive mechanism for the mower is an optional feature which may be omitted, in which case the mower is a powered push mower rather than a walk-behind mower.

A V-belt 37 runs on pulley 35. A bracket 39 is affixed on deck 13 and at its upper end has a stub shaft 41 on which is rotatably mounted a V-belt pulley 43 serving as a fixed idler pulley. Bracket 39 also serves as a support end bearing for a shaft 45 on the outer end of which a collar 47 is secured so that edger arm 49 is pivotally mounted about the axis defined by shaft 41. On the end of edger arm 49, there is a bearing case 51 for mounting of an edger blade shaft 53 in anti-friction bearings 55 which may be ball bearings, roller bearings, or other suitable anti-friction machine elements. A V-belt pulley 57 serving as the driven pulley for driving pulley 35 is mounted on shaft 53 retained by a nut 58.

A hood 59 is rigidly secured on bearing case 51. A disc 61 is fixedly secured on the end of shaft 53 and provides a mounting plate for edger blades 63. Edger blades 63 are three in number in the illustrated embodiment, but a greater number of blades could be provided if desired. Each of the blades 63 is pivotally mounted on disc 61 by a fastener 65 such as a bolt, rivet, or the like.

Each of the blades 63 is provided with a lug 67 which extends into an arcuate slot 69. The rotation of disc 61 in FIG. 2 is counter-clockwise, and thus slots 69 allow blades 63 to pivot and yield in a backward direction upon striking an object thereby minimizing the possibility of damage to the blades or the drive mechanism. Slots 69 extend about 90° but do not extend forward of the radial direction, thus inhibiting blades 63 from oscillating or from interfering one with the other. Although blade 63 could be urged to a radial or near radial direction by spring bias means, this has been found to be unnecessary, because strong centrifugal forces created by rotation of disc 61 firmly urge blades 63 to their radial or near radial position where lugs 67 are stopped at the end of slots 69.

A pivot arm 75 is rotatably mounted on shaft 41 and its pivotal motion is independent of that of edger arm 49. Pivot arm 75 is urged in a counter-clockwise or upward direction by spring 77 placed on shaft 41 and having its two extremities engaging pivot arm 75 and the bracket 39 respectively. Flat pulley 73 is rotatably mounted on pivot arm 75 and maintains suitable tension on belt 37 when edger arm 49 is in the downward operative position. Preferably the pivotal motion of pivot arm 75 is insufficient to maintain belt 37 tight when edger arm 49 is at its extreme upward position thereby causing pulley 35 to be effectively disengaged from belt 37 so that disc 61 and blades 63 are no longer rotated. A retainer 71 for pulley 57 and other retainers not shown may be provided as necessary to prevent belt 37 when in its slack condition from escaping from the grooves of V-belt pulleys 57, 43 and 35. As seen in FIGS. 1–5 disc 61 and edger blade 63 are positioned outside the right front wheel 15 of lawnmower 11 in order that the edger apparatus may be located near the front of the mower deck 13. In the illustrated embodiment, the four wheels 15 and 17 of the mower are in a substantially rectangular relationship, but it may be desired to move right front wheel 15 closer to the center line of the mower to the extent permitted by the radius of blade 23, thereby allowing the edger apparatus including disc 61 and blade 63 to be moved inward and reducing the maximum width of the lawnmower edger apparatus.

As best shown in FIG. 1, the linkage for raising and lowering the edger includes an arm 81 rigidly connected to and extending from bearing case 51, a link 83 and a control lever 85 pivotally mounted on handle 25. Bolt 87 acts as a pivot for control arm 85 and extends through a plate 89 secured to handle 25 in a vertical position; plate 89 is provided with detent holes 93 which cooperate with a projection (not shown) on control lever 85 to permit control lever 85 to be positioned and maintained in various positions. The rearmost detent hole 94 causes control lever 85 to operate through link 83 to raise disc 61 and blades 63 to an upward inoperative position. Handle 91 secured on the end of control lever 85 facilitates placement of control lever 85 by the operator.

As best shown in FIGS. 1, 6 and 7, power-take-off shaft 31 also provides power to drive the rear wheels 17 of the lawnmower edger 11 if desired. Bell cranks 103 and 105 are mounted on the left rear and right rear of deck 13 approximately directly above axle bolts 18 of wheels 17.

Bell cranks 103 and 105 are pivotally supported by brackets 107 and pivot bolts 109. The rear arms of bell cranks 103 and 105 are provided with bearing openings for shaft 111 which freely rotates therein. On shaft 111 is mounted a pulley 115 driven by power-take-off shaft 31 and pulley 119 throught V-belt 117. Bell cranks 103 and 105 may be connected together by a rigid bar 104 which better assures that they operate in unison. Forward arms of the bell cranks 103 and 105 are provided with springs 108 connected to the top of deck 13 causing bell cranks 103 and 105 to be urged to rotate in a clockwise direction as seen in FIG. 7.

Affixed on the ends of shaft 111 are friction drive rollers 113 for engaging respective ones of the two rear wheels 17. In the position of bell cranks 103 and 105 in FIG. 7, friction drive rollers 113 are not in engagement with wheels 17 due to the bias force exerted by springs 108. The operator causes engagement of friction rollers 113 with wheels 17 by operation of a safety lever 95 pivotally mounted on handle 25 by pivots 97 or other suitable fasteners. An idler pulley may be provided for controlling tension on belt 117 if desired. Lever 95 is provided with a lever arm 99 to which is connected a link rod 101 extending to and connected to a third arm 106 on bell crank 103. As best seen in FIG. 7, the operator is required to press firmly with the fingers or the hand on safety lever 95 to cause bell cranks 103 and 105 to rotate in a counter-clockwise direction bringing friction rollers 113 into engagement with wheels 17 causing forward movement of the mower powered by engine 19 through power-take-off shaft 31. Intentional or unintentional relaxation of safety lever 95 will allow springs 108 to withdraw friction rollers 113 from engagement with wheels 17 and prevent power being applied to produce forward motion of the mower edger. The friction roller arrangement and the safety lever arrangement of FIG. 6 and 7 is generally not new but provides an advantageous feature of the combination of the invention in that it allows both the mower wheels and the edger blade to be driven from the same power-take-off shaft 31.

The operation of the combination mower and edger according to the invention is believed to be self-evident from the preceding description but may be summarized as follows. When operating as a mower only, the mower 11 operates as a conventional gasoline engine powered rotary blade mower. The edger apparatus will be deactivated by movement of the handle 91 to its rearmost position which serves to lift the blades 63 well above ground level and also, in the preferred embodiment, loosen belt 37 so that it is no longer driven by pulley 35.

If the mower 11 is provided with the optional wheel driving apparatus, it may be operated either in the push mode, or it may be operated in the walk-behind, self-powered mode by causing friction rollers 113 to engage wheels 17 through movement of safety lever 95.

To operate the mower 11 in the edger mode, it is preferable to leave the friction rollers 113 disengaged so that better control may be obtained by pushing the mower at the appropriate speed; this also permits backward motion of the mower edger if desired to better position the edger blade.

For edger operation control lever 85 is positioned at a forward or intermediate position appropriate to obtain the desired depth of cut by blades 63. It should be noted that blades 63 rotate in a counter-clockwise direction so that the grass or debris which is ejected from the edger is thrown in front of the mower rather than back toward the operator. The hood 59 is also shaped to prevent grass or debris from being thrown backward.

The mower blade 23 are rotating in normal fashion during the edging operation and cause air from the chute 24 to blow grass from the edger operation off of a sidewalk or driveway in most normal edger operation.

It should be recognized that numerous variations could be made in the apparatus while retaining its advantages of a simple, trouble-free and easily maintained drive mechanism for an edger, together with an effective yieldable-blade edger operation. Although it is preferred that a single belt drive with speed increasing pulley ratios be employed for the edger, the pulley diameter ratios are subject to variations, as is the arrangement for providing idler pulleys or other means for achieving proper belt tension.

Numerous variations may be employed in providing power to drive the mower wheels for the walk-behind self-powered mower. Wheel drive power may be taken from the same power-take-off shaft as is used for the edger in any manner so long as the take-off shaft rotational speed is not changed from the desired relation of being somewhat less than the rotational speed of the main vertical shaft.

Other forms of speed reduction (or variable speed reduction) may be employed for the wheel drive than the specific illustrated example of single pulley belt and small friction rollers. Any form of wheel drive mechanism may be employed in the mower edger combination so long as it does not interfere with the single belt drive mechanism for the edger, which represents an important feature of the invention.

It will be apparent that the gasoline engine (prime mover) power-take-off shaft of the illustrated embodiment which is oriented to the right side of the mower could alternatively be on the left side of the motor. Also, the illustrated embodiment provides for driving the rear wheels of the mower, but the front wheels of the motor could be driven instead.

In addition to the variations and modifications to the invention described shown or suggested, it will be apparent to those of skill in the art that other modifications and variations may be made to the invention, and accordingly the scope of the invention is not to be construed to be limited to those variations and modifications described, shown or suggested, but is to be determined by reference to the appended claims.

What is claimed is:

1. Lawn mowing and edging apparatus comprising:

a generally horizontal mower deck;

at least three ground contacting wheels rotatably mounted to said mower deck;

a prime mover mounted above said mower deck having an output shaft, said output shaft extending vertically below said mower deck, and a power-take-off shaft having a generally horizontal axis of rotation extending from the side of and driven by said prime mover at a speed ratio of between 2:3 and 1:4 relative to said output shaft;

at least one mowing blade mounted for rotation in a horizontal plane and driven by said output shaft;

an edger blade secured on an edger shaft rotatably mounted on an edger arm pivotally mounted to said mower deck with said edger shaft axis of rotation substantially parallel to that of said power-take-off shaft;

a mechanical drive including a single driven pulley connected to said edger shaft and a single driver pulley on said power-take-off shaft coupled to said driven pulley by a single endless belt; whereby the mowing blade is constantly engaged during operation of the apparatus and the mechanical drive may selectively be activated by lowering said edger arm to perform an edging operation.

2. Apparatus as recited in claim 1 wherein said mower deck is provided with a cuttings exit opening on one side thereof, and said power-take-off shaft is positioned to the side of said mower deck above said exit opening.

3. Lawn mowing and edging apparatus comprising:

a generally horizontal mower deck;

at least three ground contacting wheels rotatably mounted to said mower deck:

a prime mover mounted above said mower deck having an output shaft, said output shaft extending vertically below said mower deck;

at least one mower blade mounted for rotation in a horizontal plane and driven by said output shaft;

a power-take-off shaft having a generally horizontal axis of rotation rotatably driven by said prime mover at a speed ration of between 2:3 and 1:4 relative to said output shaft;

an edger shaft rotatably mounted on an edger arm pivotally mounted to said mower deck with said edger shaft axis of rotation substantially parallel to that of said power-take-off shaft; said edger shaft having secured thereto multiple edger blades pivotally affixed on a plate connected to rotate with said edger shaft;

a mechanical drive including a driven pulley connected to said edger shaft and a driver pulley on said power-take-off shaft coupled to said driven pulley by an endless belt; whereby the mowing blade is constantly engaged during operation of the apparatus and the mechanical drive may selectively be activated by lowering said edger arm to perform an edging operation.

4. Apparatus as recited in claim 3 wherein said edger blades are constrained to limit their pivotal motion from approximately radial position to about 90° from radial position in the direction opposite to the rotation direction of said plate.

5. Apparatus as recited in claim 4 wherein constraint of said edger blades is obtained by arcuate slots in said plate and respective lugs on said edger blades extending into said slots.

6. Apparatus as recited in claim 3 wherein the rotation of said plate is in a direction to cause the motion of the blades at the bottom of their motion path to be forward.

7. Apparatus as recited in claim 3 wherein said mower deck is provided with a cuttings exit opening on one side thereof, and said power-take-off shaft is positioned to the side of said mower deck above said exit opening.

8. Apparatus as recited in claim 1 wherein said edger shaft has secured thereto multiple edger blades pivotally affixed on a plate connected to rotate with said edger shaft.

9. Apparatus as recited in claim 1 wherein the rotation of said edger blade is in a direction to cause the motion of the blade at the bottom of the blade motion path to be forward.

10. Apparatus as recited in claim 1 wherein the diameter of said driver pulley is at least twice the diameter of said driven pulley.

11. Lawn mowing and edging apparatus comprising:

a generally horizontal mower deck having a front, a rear, and two sides;

four ground contacting wheels rotatably mounted to said mower deck;

a prime mover mounted above said mower deck having an output shaft, said output shaft extending vertically below said mower deck;

at least one mowing blade mounted for rotation in a horizontal plane and driven by said output shaft;

a cuttings exit chute extending from one side of said deck;

a power-take-off shaft having a generally horizontal axis of rotation rotatably driven by said prime mover at a speed ratio of between 2:3 and 1:4 relative to said output shaft positioned approximately directly above said cuttings exit chute;

an edger blade secured on an edger shaft rotatably mounted on a forwardly extending arm pivotally mounted to said deck forward of said cuttings exit chute with said edger shaft axis of rotation substantially parallel to that of said power-take-off shaft;

a first mechanical drive including a driven element connected to said edger shaft and a drive element coupled to said driven element and connected to said power-take-off shaft; and a second mechanical drive coupling said power-take-off shaft to at least one of said wheels;

whereby the mowing blade is constantly engaged during operation of the apparatus, the first mechanical drive may selectively be activated to perform an edging operation, and the second mechanical drive may selectively be activated to self-power the motion of the apparatus.

12. Apparatus as recited in claim 11 wherein said edger shaft has secured thereto multiple edger blades pivotally affixed on a plate connected to rotate with said edger shaft.

13. Apparatus as recited in claim 12 wherein said edger blades are constrained to limit their pivotal motion from approximately radial position to about 90° from radial position in the direction opposite to the rotation direction of said plate.

14. Apparatus as recited in claim 13 wherein constraint of said edger blades is obtained by arcuate slots in said plate and respective lugs on said edger blades extending into said slots.

15. Apparatus as recited in claim 14 wherein the rotation of said edger blades is in a direction to cause the motion of the blades at the bottom of their motion path to be forward.

16. Apparatus as recited in claim 11 wherein the rotation of said edger blade is in a direction to cause the motion of the blades at the bottom of their motion path to be forward.

* * * * *